United States Patent [19]

Smith et al.

[11] Patent Number: 4,475,049

[45] Date of Patent: Oct. 2, 1984

[54] REDUNDANT SERIAL COMMUNICATION CIRCUIT

[76] Inventors: Robert E. Smith, 3560 Gutherie Mtn. Pl., Tucson, Ariz. 85718; Francis L. Payne, 411 E. Lazy Horse Pl., Tucson, Ariz. 85704

[21] Appl. No.: 261,637

[22] Filed: May 7, 1981

[51] Int. Cl.³ .................... H03K 17/16; H04B 3/02
[52] U.S. Cl. .................... 307/441; 307/219; 307/242; 307/443; 328/153; 328/154
[58] Field of Search ................ 307/200 A, 441, 443, 307/219, 238.3, 238.6, 242, 243, 244; 328/104, 105, 152, 154

[56] References Cited

U.S. PATENT DOCUMENTS

| | | | |
|---|---|---|---|
| 3,363,111 | 1/1968 | Moreines | 307/200 A X |
| 3,800,164 | 3/1974 | Miller | 307/441 |
| 4,154,395 | 5/1979 | Fancy | 307/441 X |
| 4,199,799 | 4/1980 | Ostenso et al. | 307/441 X |

Primary Examiner—Larry N. Anagnos
Assistant Examiner—David R. Hudspeth
Attorney, Agent, or Firm—Harry M. Weiss

[57] ABSTRACT

A circuit for carrying data between a host system and a remote unit includes first and second edge-triggered delay-type flip-flops coupled to first and second input lines, respectively. Combinational logic coupled to the output of the first flip-flop and to the first and second input lines transmits data on at least one of the input lines to the remote unit. This creates a redundancy which provides for the continued transmission of data between the host and the remote unit in the event that one of the input channels fails.

27 Claims, 4 Drawing Figures

REDUNDANT SERIAL COMMUNICATION CIRCUIT

BACKGROUND OF THE INVENTION

1. Field of the Invention

This invention relates generally to communication systems and, more particularly, to a serial data communication link between a host system and a remote communication processor.

2. Description of the Prior Art

Serial data communications between a host processor and a remotely located control system is generally accomplished by means of a single multi-wire cable path. Any disruption in this single communication link will result in losing communication with and control of the remote unit. To enhance reliability, a second communication line may be coupled between the host and the remote unit. However, this generally requires reproduction of the transmit/receive hardware in the remote unit and implementation of sophisticated switch-over techniques both of which result in substantial increases in cost and complexity.

SUMMARY OF THE INVENTION

It is an object of the present invention to provide an improved redundant communication link.

It is a further object of the present invention to provide a redundant communication link between a host and remotely located control unit, which unit includes a data communication processor.

It is still a further object of the present invention to provide a redundant communication path between a host and a remotely located control unit which includes an improved arbitration circuit.

Finally, it is an object of the present invention to provide a multi-input arbitration circuit which detects which input line is active and automatically channels data on that line to communication processing hardware.

According to a broad aspect of the invention, there is provided a circuit for carrying data between first and second systems, comprising: a first switching device having an output means capable of assuming at least first and second states, and having an input coupled to a first input line for receiving data from said first system; a second switching means having an output capable of assuming at least first and second states, and having an input coupled to a second input line for receiving data from said first system and having its output coupled to said first switching device for placing said first switching device output means in said first state when the data on said second input line undergoes a a first data signal transition after the failure on the first input line, and for placing said output means in said second state when the data on said first input line undergoes a transition; and logic means coupled to said first and second input lines and to said first switching device output means for transmitting data on at least one of said first and second input lines from said first system or station to said second system or station.

The above and other objects, features and advantages of the present invention will be more clearly understood from the following detailed description taken in conjunction with the accompanying drawings, in which:

THE SPECIFICATION

Figure 1:
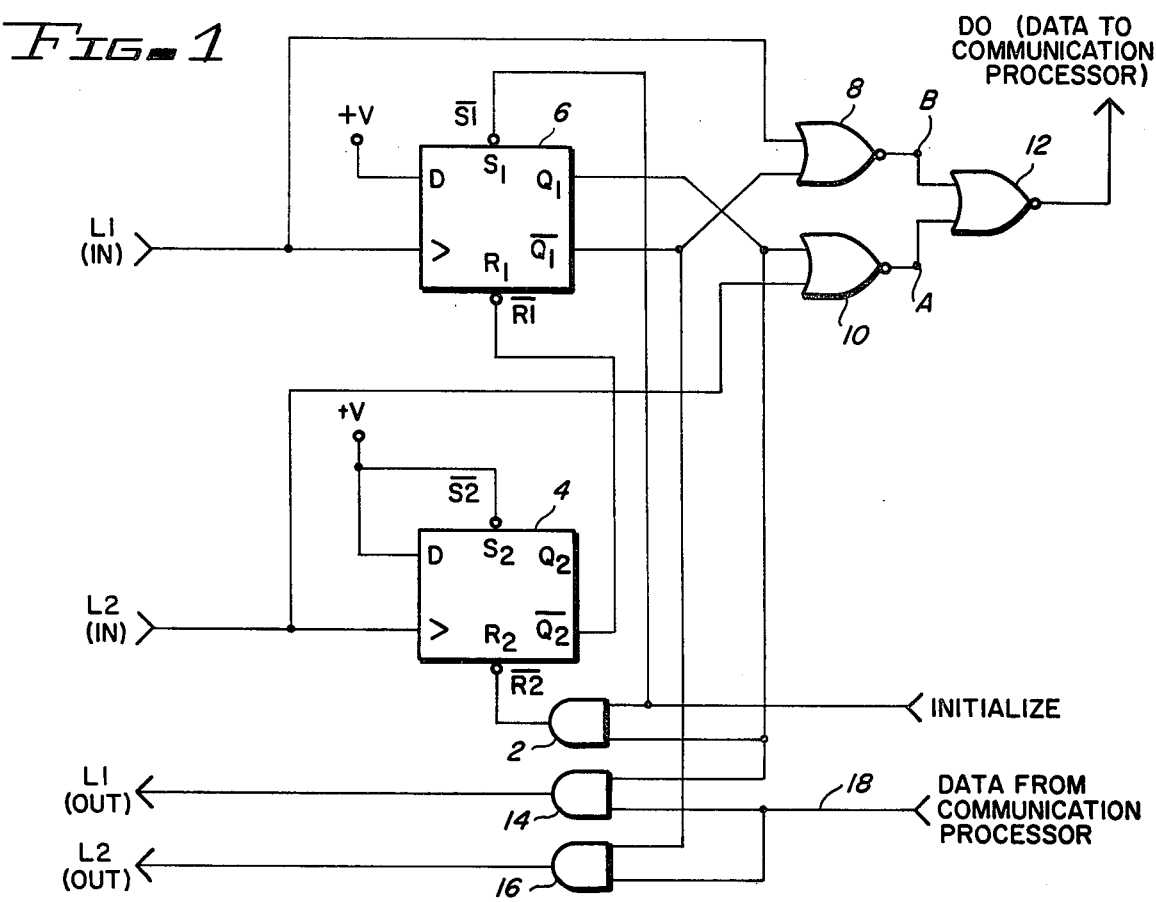
FIG. 1 is a logical block diagram of the inventive communication link and arbitration logic; of the present invention

FIG. 1 illustrates one embodiment of the inventive redundant communication circuit of the present invention. A dual edge-triggered arbitration circuit is shown which detects which receive or input line, $L1_{(in)}$ or $L2_{(in)}$, is active and automatically channels the data on that line to the communication processing hardware. The appropriate transmit or output line, $L1_{(out)}$ or $L2_{(out)}$, is simultaneously enabled.

In a first mode of operation, communication between the host and the remote unit is over one line or the other but not both simultaneously. The host system decides which line should be active. Normally, one line (e.g. $L1_{(in)}$) is designated as a "standard" line and the other line ($L2_{(in)}$) is designated a "back-up" line. If the remote unit fails to respond to any given command, the host system would switch to the back-up line and attempt to re-establish communication.

In a second mode of operation, communication occurs simultaneously over both lines. Data from the host system is presented substantially simultaneously on lines $L1_{(in)}$ and $L2_{(in)}$. This simplifies the communication hardware at the host and eliminates the need for decision making by the host.

The circuit or logical block diagram of the present invention includes first and second delay-type flip-flops 4 and 6 (e.g. 74LS74); first, second and third two-input logical AND gates 2, 14 and 16, respectively (e.g 74LS08); and first, second and third two-input logical NOR gates 8, 10 and 12, respectively (e.g. 74LS02). The first communication line, $L1_{(in)}$, from the host is coupled to an input of flip-flop 6 and to one input of NOR gate 8. The delay input (D) of flip-flop 6 is coupled to a positive voltage (+V). The Q1 output of flip-flop 6 is coupled to one input of NOR gate 10, to one input of AND gate 2, and to one input of AND gate 14. The $\overline{Q_1}$ output of flip-flop 6 is coupled to a second input of NOR gate 8 and to a first input of AND gate 16.

The second communication line, $L2_{(in)}$, from the host is coupled to an input of flip-flop 4 and to a second input of NOR gate 10. Both the delay (D) and set ($\overline{S_2}$) inputs of flip-flop 4 are coupled to a source of positive potential +V. The reset input ($\overline{R_2}$) of flip-flop 4 is coupled to the output of AND gate 2 while the $\overline{Q_2}$ output of flip-flop 4 is coupled to the reset input ($\overline{R_1}$) of flip-flop 6. An initialize signal ($\overline{\text{INITIALIZE}}$) is coupled to the second input of AND gate 2 and to the set input ($\overline{S_1}$) of flip-flop 6. The outputs of NOR gates 8 and 10 are coupled to first and second inputs of NOR gate 12 the output (DO) of which carries data to the communication processor within the remote unit. Data from the communication processor is applied via input line 18 to second inputs of AND gate 14 and 16.

With respect to the signal levels appearing on communication lines $L1_{(in)}$ and $L2_{(in)}$, a logical zero represents a mark condition and a logical one represents a space condition. Data In is data from the host system to the remote unit, and Data Out is data from the remote system to the host.

During the initialization and power-up phase, a logical high (+V) is applied to the D inputs of flip-flops 4 and 6, and to the $\overline{S_2}$ input of flip-flop 4. Thus, S2 is a logical zero and flip-flop 4 is not set. When an initiatize signal ($\overline{\text{INITIALIZE}}$) goes low, the output of AND gate 2 ($\overline{R_2}$) is low causing R2 to go high. This causes $\overline{Q_2}$ and thus $\overline{R_1}$ to go high. With R1 high, R1 remains low and flip-flop 6 is not reset (i.e. $\overline{Q_1}$) does not go high. However, since $\overline{\text{INITIALIZE}}$ is also coupled to $\overline{S_1}$ S1, will go high when $\overline{\text{INITIALIZE}}$ goes low. This causes Q1 to go high. In this manner, L1$_{(in)}$ is chosen to be the standard line and L2$_{(in)}$ the back-up line.

During normal operation, data from the host system placed on L1$_{(in)}$ is applied to a first input of NOR gate 8. Since $\overline{Q_1}$ is low, the data is inverted and appears at the output of NOR gate 8 (node B). The output of NOR gate 10 (node A) is low because Q1 is high. Thus, the data (DO) is reinverted by NOR gate 12 and applied to the communication processor.

Output Q1 is also applied to an input of AND gate 14. When Q1 is high, as it is during normal operation, AND gate 14 is enabled to pass data on line 18 from the communication processor through AND gate 14 onto L1$_{(out)}$. AND gate 16 remains disabled since $\overline{Q_1}$ is low.

Figure 2:
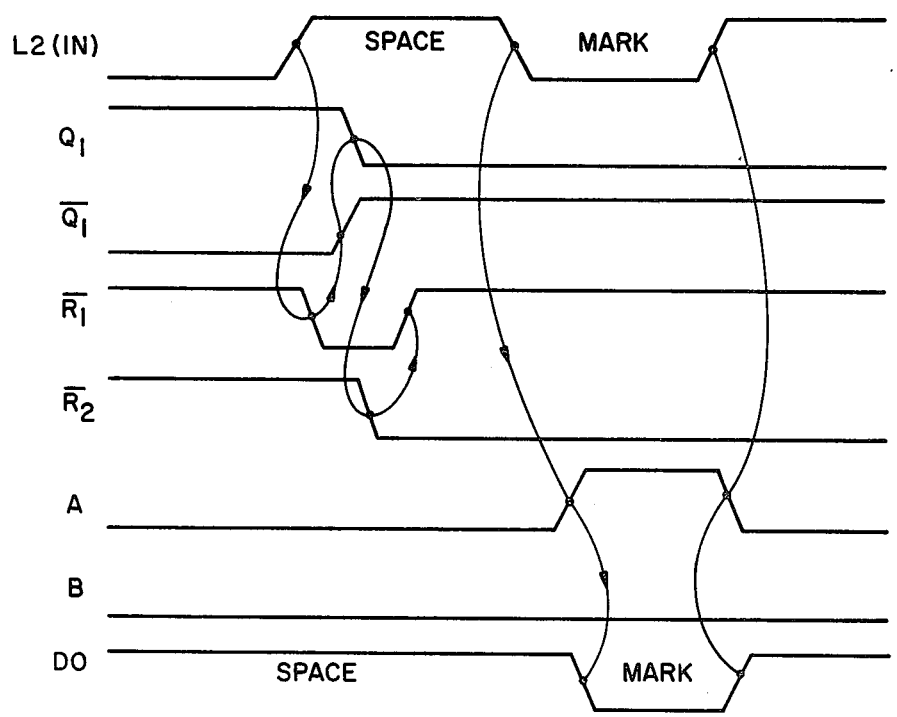
FIGS. 2, 3 and 4 are timing diagrams useful in explaining various modes of operation of the circuit or logical block diagram shown in FIG. 1.

To illustrate how the circuit shown in FIG. 1 operates in a failure mode, assume that line L1$_{(in)}$ fails in a high state and that data is now being transmitted by the host system over line L2$_{(in)}$. When L2$_{(in)}$ undergoes a low-to-high transition after a line failure has been detected and the lines switched, Q2 goes high and $\overline{Q_2}$ is allowed to go low since both $\overline{\text{INITIALIZE}}$ and Q1 are high. Reset input $\overline{R_1}$ goes low causing R1 to go high resetting flip-flop 6; i.e. Q1 goes low and $\overline{Q_1}$ goes high. With $\overline{Q_1}$ high, node B remains low; however, the data on L2$_{(in)}$ is inverted by gate 10 since Q1 is low. The inverted data appears at node A and is reinverted by gate 12 the output of which is coupled to the communication processor. With Q1 now high and Q1 low, data from the communication processor on line 18 is gated through AND gate 16 to L2$_{(out)}$. When Q1 went low, the output of AND gate 2 also went low causing R2 to go high. This raises $\overline{Q_2}$ and thus $\overline{R_1}$ to a high level. With $\overline{R_1}$ high, R1 again goes low. Operation of the circuit when L1$_{(in)}$ fails high and data is being transmitted over L2$_{(in)}$ as above described is illustrated in the timing diagram of FIG. 2. As can be seen, the next mark transmitted after Q1 goes low is placed on output line DO.

Figure 3:
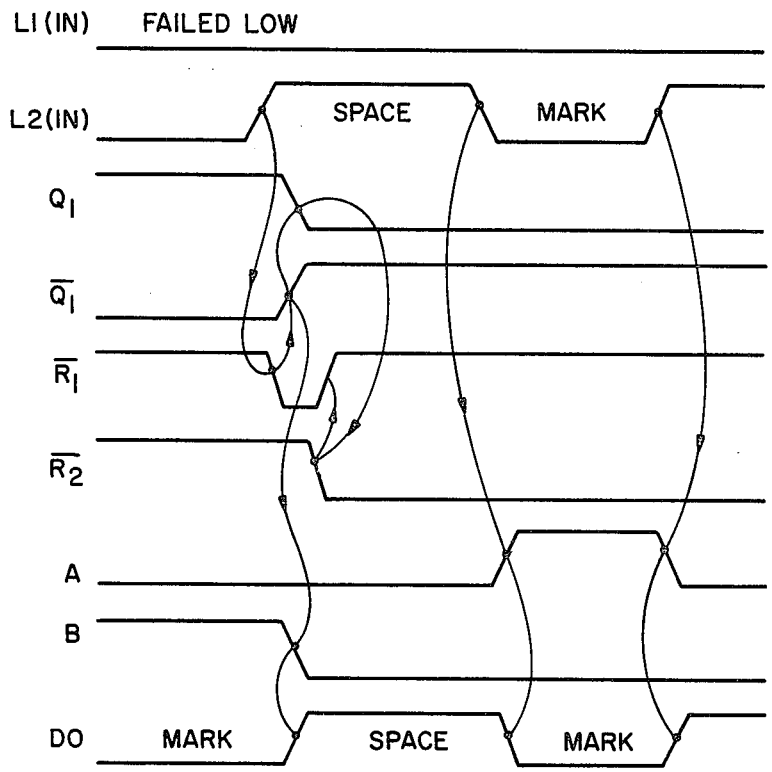

FIG. 3, illustrates, in part, how the circuit operates if L1$_{(in)}$ fails low. When the signal on L2$_{(in)}$ undergoes a a positive transition on the first rising edge of L2$_{(in)}$ after the failure of the first input line L1$_{(in)}$, Q2 goes high and $\overline{Q_2}$ goes low as before. Reset signal R1 again goes high resetting flip-flop 6; i.e. Q1 goes low and $\overline{Q_1}$ goes high. Since L1$_{(in)}$ has failed in a low state, the signal appearing at node B will be high and go low when flip-flop 6 becomes reset. The next mark occurring on L2$_{(in)}$ will appear in inverted form at node A as was described in conjunction with the previous failure node. The data signal appearing at the output of NOR gate 12 (DO) shown in FIG. 3 results.

As was the case previously, when Q1 goes low, R2 goes high causing $\overline{Q_2}$ and $\overline{R_1}$ to go high. With $\overline{Q_1}$ high, data from the communication processor is routed via line 18 and AND gate 16 to the host system over L2$_{(out)}$.

Figure 4:
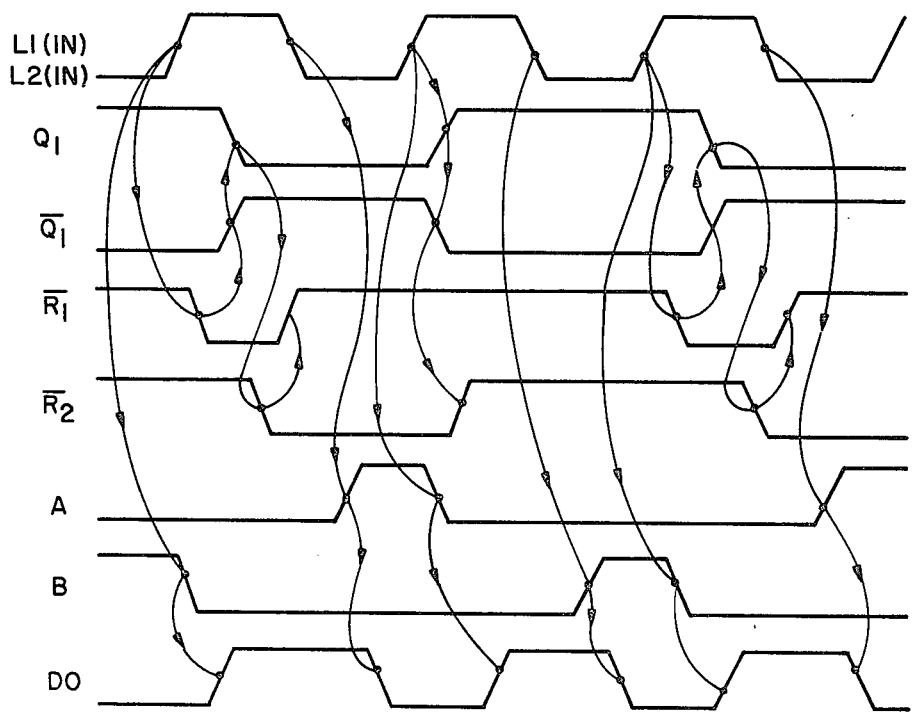

Finally, as shown in FIG. 4, the circuit shown in FIG. 1 will accurately convey data to the remote unit if the data is simultaneously placed on L1$_{(in)}$ and L2$_{(in)}$. During the first positive transition after the failure of one of the first and second input lines on L1$_{(in)}$ and L2$_{(in)}$, node B goes low, $\overline{R_1}$ goes low, Q1 goes low and $\overline{Q_1}$ goes high. Reset signal $\overline{R_2}$ goes low and then $\overline{R_1}$ again goes high. Since node A is sitting at a low logic level, the output of gate 12 goes high. When the signal on L1$_{(in)}$ and L2$_{(in)}$ goes low, node A rises to a high logic level causing DO to go low. During the next positive transition on L1$_{(in)}$ and L2$_{(in)}$, Q1 goes high, $\overline{Q_1}$ goes low and $\overline{R_2}$ again goes high. The signal at node A again falls to a low level causing DO to rise again. The next negative transition on L1$_{(in)}$ and L2$_{(in)}$ causes node B to rise and therefore DO to fall. Thus, the data on L1$_{(in)}$ and L2$_{(in)}$ is faithfully reproduced at DO.

Further examination of the circuit would reveal that should the data appearing on L1$_{(in)}$ and L2$_{(in)}$ be slightly out of phase, the mark/space count at DO would not be compromised. Only the widths of the marks and spaces would vary.

The above description is given by way of example only. Changes in form and details may be made by one skilled in the art without departing from the spirit and scope of the invention. For example, the number of redundant paths may be increased by simply expanding the circuitry shown in FIG. 1.

What is claimed is:

1. A circuit for carrying data signals between first and second systems, comprising:
   a first data input line for transmitting signals from said first system to said second system;
   a second data input line for transmitting signals from said first system to said second system, only one of said first and second data input lines being active at a given time, the signals being transmitted on said only the active one of said first and second data input lines including "high" signals and "low" signals and transitions therebetween;
   said first system including means for detecting a failure in the active one of said first and second data input lines for switching to the other of said first and second data input lines in response thereto;
   a first switching means having an output means including an inverting and a non-inverting output, each of said inverting and non-inverting outputs being capable of assuming first and second output logic levels, a first output state being defined by a first logic level at said non-inverting output and a second logic level at said inverting output and a second output state being defined by a second logic level at said non-inverting output and a first logic level at said inverting output, respectively, and having a data input operatively coupled to said first data input line for receiving signals from said first system;
   a second switching means having a data input operatively coupled to said second data input line for receiving signals transmitted from said first system when a failure is detected in said first data input line and said second data input lines becomes active and having at least one output operatively coupled to said first switching means for placing said inverting and non-inverting outputs thereof in said first state when a failure is detected on said first data input line, said second data input line becomes active, and the signals on said second data input line undergoes a signal transition, said inverting and non-inverting outputs being placed in said second state when a failure is detected on said second data input line, said first input line becomes active, and the signals on said first data input line undergoes a signal transition; and system output means including first and second data output lines operatively coupling the second system to the first system, and first data output line corresponding to said first data input line for forming a first pair of input and output lines, and said second data output line corresponding to said second data input line for forming a second pair of input and output lines, wherein one of said pairs of corresponding input and output lines is active and the other is inactive at any one time; and input logic means operatively coupled to both the inverting and non-inverting outputs of said first switching means for determining which of said first and second data input lines is currently active, said input logic means being operatively coupled to said first and second data input lines fo enabling transmission of signals transmitted from said first system to said second system on said whichever one of said first and second data input lines is determined to be currently active.

2. The circuit of claim 1 wherein said first and second logic levels correspond to high and low voltages levels, respectively, wherein said first output state corresponds to said non-inverting output being at said high voltage level and said inverting output being at said low voltage level, said second output state corresponding to said non-inverting output being at said low voltage level and said inverting output being at said high voltage level, said two pairs of opposite voltage levels corresponding to a determination of which one of said first and second data input lines is currently active.

3. The circuit of claim 1 wherein said second system generates output signals for transmission to said first system, and wherein said system output means includes output gating means operably coupling said second system output signals to said first and second data data output lines, such that whenever said output means of said first switching means is in said first output state, said system output means enables transmission of said output signals to said first system over said first data output line, and whenever said output means of said first switching means is in said second output state, said system output means enables transmission of said output signals to said first system over said second data output line.

4. The circuit of claim 2 wherein said first switching means includes a first flip-flop and said second switching means includes a second flip-flop, each of said flip-flops having at least a RESET input and a DATA input, wherein said flip-flop includes said non-inverting output and said inverting output of said first switching means as its respective non-inverting and inverting outputs, and wherein said second flip-flop includes said at least one output of said second switching means as its respective output, said circuit further including means operatively coupling said second flip-flop output to said RESET input of said first flip-flop; said second system generating an initialization signal for placing said circuit into a predetermined state of enablement of said first and second data input lines and said first and second data output lines, wherein said circuit includes logical gating means responsive to said initialization signal, said logical gating means being coupled to said RESET input of said second flip-flop to place said first flip-flop outputs into a predetermined initial output state.

5. The circuit of claim 4 wherein said first and second flip-flops are triggered by the positive-going edges of signals on said first and second data input lines operatively coupled to the first data inputs of said first and second flip-flops, respectively.

6. The circuit of claim 5 wherein send first and second flip-flops are delay-type flip-flops.

7. The circuit of claim 4 wherein said input logic means comprises: a first NOR gate having at least a first input coupled to said inverting output of said first flip-flop, a second input coupled to said first data input line, and having an output; a second NOR gate having at least a first input coupled to said non-inverting output of said first flip-flop, a second input coupled to said second data input line, and having an output; and a third NOR gate having at least a first input coupled to the output of said first NOR gate, a second input coupled to the output of said second NOR gate, and having an output for transmitting said signals to said second system.

8. The circuit of claim 4 wherein said system output means further comprises: a first AND gate having at least a first input coupled to said non-inverting output of said first flip-flop, a second input coupled for receiving signals from said second system to be transmitted to said first system, and an output coupled to said first data output line; a second AND gate having at least a first input coupled to said inverting output of said first flip-flop, a second input coupled for receiving said signals from said second system to be transmitted to said first system, and an output coupled to said second data output line; wherein said first and second AND gates respectively enable transmission of said signals from said second system to said first system over whichever of said first and second data output lines is active.

9. The circuit of claim 8 wherein said logical gating means comprises: a third AND gate having a first input coupled to receive said initialization signal, and a second input coupled to said non-inverting output of said first flip-flop, and an output coupled to said RESET input of said second flip-flop; wherein said first flip-flop includes a SET input coupled to receive said initialization signal; and wherein said initialization signal resets said second flip-flop and sets said first flip-flop to initialize said circuit prior to transmission of said signals from said second system to said first system.

10. The circuit of claim 1 wherein said first system is a host system and said second system is a remote data communication-processor or the like.

11. A circuit for carrying data between first and second systems, comprising:
a first data input line from the first system to the second system;
a first switching means having an inverting output and a non-inverting output capable of assuming at least first and second output states, and having a data input operatively coupled to said first data input line for receiving incoming data from said first system when said first data input line is active, said first switching means further including a first input and a second input;
a second data input line from said first system to said second system, only one of said first and second data input lines being active at a given time, the data on said active one of said first and second data input lines including high signals, low signals, and signal transitions therebetween;
said first system including means for detecting a failure on the one end of said first and second data input lines which is active and means responsive to said detected failure for switching lines such that the other of said first and second data input lines becomes active;

a second switching means having a data input operatively coupled to said second data input line for receiving incoming data from said first system when said second data input line is active, said second switching means further including a first input, and said second switching means having at least one output operatively coupled to said first input of said first switching means for placing said inverting and non-inverting outputs in said first state when said first data input line fails, said second data input line becomes active, and the data on said active second data input line undergoes a transition, said inverting and non-inverting outputs being placed in said second state when said second data input line fails, said first data input line become active, and the data on said active first data input line undergoes a transition;

input logic means operatively coupled to said first and second data input lines and to both the inverting and non-inverting outputs of said first switching means for determining which of said first and second data input lines is currently active and for transmitting data on said one of said first and second data input lines determined to be currently active to said second system wherein the non-inverting output and inverting output are each capable of assuming opposite first and second voltage levels, said non-inverting output, said inverting output, said first data input line, and said second data input line being the inputs of said output logic means for determining which of said first and second data input lines is active and for transmitting the incoming data on whichever of said first and second data input lines is determined to be active at that time;

said first state corresponding to said first non-inverting output being at said first voltage level and said second inverting output being at said second voltage level, said second state corresponding to said first non-inverting output being at said second voltage level and said second inverting output being at said first voltage level, said two pairs of opposite levels corresponding to a determination of which one of of the first and second data input lines is currently active; and initialization means including means for receiving an initialization signal, initialization logic means for operatively coupling said initialization signal to the first input of said second switching means and means for operatively coupling said initialization signal to the second input of said first switching means for initializing said first switching means to place said non-inverting and inverting outputs in initial predetermined states.

12. A circuit of claim 11 further including a first data output line operatively coupled between the second system and the first system, a second data output line operatively coupled between the second system and the first system, only one of said first and second data output lines being active at any given time, output logic means operatively coupled to said second system and to said non-inverting and inverting outputs of said first switching system for receiving data from said second system in transmitting the data to said first system over a selected one of said first and second data output lines.

13. The circuit of claim 12 wherein said first switching device is a first flip-flop and said second switching device is a second flip-flop, each of said flip-flops having a first data input coupled to said first and second data input lines, respectively, each having an inverting output and a non-inverting output and said first flip-flop having a RESET input and a SET input, as respectively being said first input and said second input of said first switching means, and said second flip-flop having at least a RESET input being said first input of said second switching means, said first flip-flop having its RESET input operatively coupled to the inverting output of said second flip-flop.

14. The circuit of claim 13 wherein said first and second flip-flops are triggered by positive-going edges of data pulses on said first and second data input lines.

15. The circuit of claim 14 wherein said first and second flip-flops are delay-type flip-flops.

16. The circuit of claim 13 wherein said input logic means comprises:

a first NOR gate having a first input coupled to the inverting output of said first flip-flop, a second input coupled to the first data input line, and having a first NOR gate output;

a second NOR gate having at least a first input coupled to the non-inverting output of said first flip-flop, a second input coupled to the second data input line and having a second NOR gate output; and a third NOR gate having at least a first input coupled to the output of said first NOR gate, a second input coupled to the output of said second NOR gate, and having a third NOR gate output operatively coupled to said second system for supplying incoming data thereto.

17. The circuit of claim 13 wherein said output logic means comprises:

a first logical AND gate having at least a first input coupled to the non-inverting output of said first flip-flop, a second input coupled to said second system output for receiving data therefrom, and an output coupled to said first data output line for transmitting data back to said first system from said second system; and a second logical AND gate having at least a first input coupled to the inverting output of said first flip-flop, a second input coupled to said second system output for receiving data therefrom, and an output coupled to said second data output line for transmitting data from said second system back to said first system.

18. The circuit of claim 17 wherein the second system generates the initialization signal, and wherein the initialization logic means comprises a third logical AND gate, having a first input coupled to the means for receiving said initialization signal, having a second input coupled to the non-inverting output of the first flip-flop, and having an output coupled to the RESET input of the second flip-flop; wherein the initialization means, upon reception of the initialization signal from the second system prior to data transmission from the second system to the first system, sets the first flip-flop and resets the second flip-flop.

19. The circuit of claim 11 wherein said first system includes a host system and said second system includes a remote data communication processor.

20. A serial data communication system for transmitting data between a first station and a second station comprising:
- a first standard serial communication data input line normally used for transmitting data from the first station to the second station;
- a second back-up serial communication data input line for transmitting data from the first station to the second station;
- a first flip-flop including a data input operatively coupled to the first standard serial communication data input line, an inverting output, and a non-inverting output;
- a second flip-flop including a data input operatively coupled to the second back-up serial communication data input line and having an inverting output; and
- arbitration circuit logic means responsive to input signals from said first standard serial communication data input line, said second back-up serial communication data input line, said inverting output of said first flip-flop and said non-inverting output of said first flip-flop, for determining which of said first an second serial communication data input lines are currently active and for automatically channeling the data on the active line to the second station.

21. The serial data communication system of claim 20 wherein one and only one of said first standard serial communication data input line and said second back-up serial communication data input line is active at any given time.

22. The serial data communication system of claim 20 wherein said arbitration circuit logic means includes:
- a first logical NOR gate having a first input operatively coupled to said first standard serial communication data input line, a second input operatively coupled to the inverting output of said first flip-flop, and said first NOR gate having an output;
- a second logical NOR gate having a first input operatively coupled to the second back-up serial communication data input line, a second input operatively coupled to the non-inverting output of the first flip-flop, and said second NOR gate having and output; and
- a third logical NOR gate having a first input operatively coupled to the output of the first logical NOR gate, a second input operatively coupled to the output of the second logical NOR gate, and said third NOR gate having an output operatively coupled to supply input data from an active one of at least said first standard serial communication data input line and said second back-up serial communication data input line to said second station.

23. The serial data communications system of claim 20 wherein said first flip-flop includes a SET input and a RESET input, wherein said second flip-flop includes a RESET input, and wherein said second system includes means for generating an INITIALIZATION signal, a first serial communication data output line operatively coupling said second station to said first station, a second serial communication data output line operatively coupling said second station to said first station, at least one of said first and second serial communication data output lines being active at any give time, further including output logic means comprising:
- a first logical AND gate having a first input operatively coupled to receive said INITIALIZATION signal from said second station, a second input operatively coupled to the non-inverting output of the first flip-flop, and a first logical AND gate output operatively coupled to the RESET input of the second flip-flop;
- a second logical AND gate having a first input operatively coupled to the non-inverting output of the first flip-flop, a second input operatively coupled to receive serial output data to be transmitted from said second system to said first system, and said second logical AND gate having an output operatively coupled to said first serial communication data output line for operatively coupling the data to be transmitted from the second system to the first system;
- a third logical AND gate having a first input operatively coupled to the inverting output of the first flip-flop, a second input operatively coupled to receive serial output data to be transmitted from said second system to said first system, and said third logical AND gate having an output operatively coupled to said second serial communication data output line for operatively coupling data to be transmitted from the second system to said first system; and
- means for operatively coupling the initialization signal from the second station to the first input of the first logical AND gate and to the SET input of the first flip-flop and the inverting output of the second flip-flop to the RESET input of the first flip-flop such that the occurrence of said initialization signal enables a signal to be applied to the SET input of the first flip-flop and to the RESET input of the second flip-flop to establish a predetermined initial state of the system.

24. The serial data communications system of claim 20 wherein said first and second flip-flops are delay flip-flops each including a delay input and a clock input, wherein the delay input of each of the first and second delay flip-flops are directly connected to a positive source of potential, wherein said clock inputs are used as the data inputs and operatively coupled to said first standard serial communication data input line and said second back-up serial communication data input line, respectively, wherein the inverting output of the second delay flip-flop is directly coupled back to the RESET input of the first flip-flop; and wherein the system includes a pair of first and second serial communication data output lines for transmitting data from the second station to the first station.

25. The serial data communication system of claim 22 wherein said first and second flip-flops and said arbitration circuit logic means are:
(1) for monitoring normal operation wherein data from the first station is supplied to the second station over said first standard serial communication data input line;
(2) for detecting a first transition after the first standard serial communication data input line has failed and the second back-up serial communication data input line has become active for rerouting incoming data to said second station and for activating said second serial communication data output line for transmitting data from said second station to said first station; and
(3) for detecting a first transition after the second back-up serial communication data input line has failed and said first standard serial communication data input line has become active for restoring the original routing of incoming data to said second station and for activating said first serial communication data output line for transmitting data from said second station to said first station.

26. The serial data communications system of claim 20 wherein both said first standard serial communication data input line and said second back-up serial communication data input line may be active at the same time.

27. The serial data communication system of claim 26 wherein said first and second flip-flops and said arbitration circuit logic means additionally includes means for monitoring high and low data signals simultaneously placed on both the first standard serial communication data input line and the second back-up serial communication data input line and for detecting whenever one of the lines fails, said arbitration circuit logic means including logic means responsive to the detection of the high and low data signals for always transmitting one of a high and low portion thereof and then the inverse portion along alternate data paths such that the totality of the data transmitted on the first standard serial communication data input line and second back-up serial communication data input line is faithfully reproduced for transmission to said second station.

* * * * *

UNITED STATES PATENT AND TRADEMARK OFFICE
CERTIFICATE OF CORRECTION

PATENT NO. : 4,475,049

DATED : October 2, 1984

INVENTOR(S) : Robert E. Smith et al

It is certified that error appears in the above-identified patent and that said Letters Patent is hereby corrected as shown below:

Column 5, line 18, "fo" should read -- for --.

Column 5, line 24, "voltages" should read -- voltage --.

Column 5, line 53, add --first-- between "said" and "flip-flop".

Column 6, line 6, "send" should read -- said --.

Column 9, line 24, "an" should read -- and --.

Signed and Sealed this

Twelfth Day of November 1985

[SEAL]

Attest:

Attesting Officer

DONALD J. QUIGG

Commissioner of Patents and Trademarks